(12) United States Patent     (10) Patent No.:   US 12,589,716 B2

Hejduk                (45) Date of Patent:     Mar. 31, 2026

(54) RAIN SENSOR SYSTEM, VEHICLE AND METHOD FOR DETECTING RAIN

(71) Applicant: VALEO SCHALTER UND SENSOREN GMBH, Bietigheim-Bissingen (DE)

(72) Inventor: Michal Hejduk, Prague (CZ)

(*) Notice: Subject to any disclaimer, the term of this patent is extended or adjusted under 35 U.S.C. 154(b) by 199 days.

(21) Appl. No.: 18/562,563

(22) PCT Filed: May 19, 2022

(86) PCT No.: PCT/EP2022/063501

§ 371 (c)(1),
(2) Date: Nov. 20, 2023

(87) PCT Pub. No.: WO2022/243400

PCT Pub. Date: Nov. 24, 2022

(65) Prior Publication Data

US 2024/0246514 A1     Jul. 25, 2024

(30) Foreign Application Priority Data

May 20, 2021    (DE) ..................... 10 2021 113 065.4

(51) Int. Cl.
*B60S 1/08*        (2006.01)
*G06T 5/73*        (2024.01)
*G06T 7/70*        (2017.01)

(52) U.S. Cl.
CPC .......... *B60S 1/0837* (2013.01); *B60S 1/0844* (2013.01); *G06T 5/73* (2024.01); *G06T 7/70* (2017.01);

(Continued)

(58) Field of Classification Search
CPC .... B60S 1/0833; B60S 1/0822; B60S 1/0818; B60S 1/0837; B60S 1/0844; B60S 1/0862;

(Continued)

(56) References Cited

U.S. PATENT DOCUMENTS 7,259,367 B2    8/2007   Reime
7,830,267 B2 *   11/2010   Veerasamy ....... B32B 17/10761
                                    340/602

(Continued)

FOREIGN PATENT DOCUMENTS

DE      102009000005 A1    7/2010
DE      102009045615 A1    4/2011

(Continued)

OTHER PUBLICATIONS

Miyahara Takayuki, Jun. 3, 2010, Visibility Condition Determination Device, Program for Visibility Condition Determination Device and Visibility Condition Determination Method. (Year: 2010).*

(Continued)

*Primary Examiner* — John W Miller
*Assistant Examiner* — Humam M Satti
(74) *Attorney, Agent, or Firm* — Osha Bergman Watanabe & Burton LLP

(57) ABSTRACT

A rain sensor system (1) for detecting rain on a window (101) of a vehicle (100), comprising:

a camera device (2) configured to capture images (14) of an area surrounding the vehicle (100) which is located in a field of view (103) of the camera device (2); and multiple rain sensors (5) which are arranged on the window (101) and at least partially in the field of view (103) of the camera device (2), each rain sensor (5) comprising:

a light guide (7) which is configured to guide light from a light source (6) to a 10 light injection point (8) at which the light is injected into the window (101), and (Continued)

a receiver (9) configured to receive the light injected into the window (101) and guided to the receiver (9) through the window (101), and to guide the received light to the camera device (2).

12 Claims, 6 Drawing Sheets

(52) U.S. Cl.
CPC .............. *G06T 2207/30242* (2013.01); *G06T 2207/30252* (2013.01)

(58) Field of Classification Search
CPC .... B60S 1/0874; B60S 1/0877; B60S 1/0892; B60S 1/485; B60S 1/0859; B60S 1/0881; B60S 1/0888; G06V 20/56; Y10S 318/02; B60W 2420/403; G01N 2021/435; G01N 21/17; G01N 21/552; G01N 21/01; B60R 2011/0026; B60R 2300/108; G06T 2207/30248; G06T 2207/30252; G06T 2207/30261; G06T 5/73; G06T 7/70; G06T 2207/30242

See application file for complete search history.

(56) References Cited

U.S. PATENT DOCUMENTS

| | | | | |
|---|---|---|---|---|
| 2003/0156291 | A1* | 8/2003 | Tsunetomo | B60S 1/0822 |
| | | | | 356/445 |
| 2008/0212101 | A1* | 9/2008 | Wolf | B60S 1/084 |
| | | | | 356/445 |
| 2011/0253917 | A1 | 10/2011 | Rothenhaeusler | |
| 2013/0235381 | A1 | 9/2013 | Kroekel et al. | |
| 2014/0029008 | A1* | 1/2014 | Hirai | G06V 20/56 |
| | | | | 356/445 |
| 2022/0014674 | A1* | 1/2022 | Ota | B60R 11/04 |
| 2024/0009971 | A1* | 1/2024 | Kingman | G02B 6/005 |

FOREIGN PATENT DOCUMENTS

| | | | | |
|---|---|---|---|---|
| DE | 102011055928 | A1 | 6/2013 | |
| DE | 102015218500 | A1 | 3/2017 | |
| DE | 102021109171 | A1 * | 10/2022 | H04N 23/56 |
| EP | 0832798 | A2 | 4/1998 | |
| EP | 1300669 | A1 * | 4/2003 | B60S 1/0818 |
| EP | 2189340 | A2 * | 5/2010 | H04N 23/55 |
| EP | 2846151 | A1 * | 3/2015 | B60S 1/0833 |
| EP | 2965956 | B1 | 2/2019 | |
| JP | 2010121959 | A * | 6/2010 | B60S 1/0818 |
| WO | WO-2013122242 | A1 * | 8/2013 | G01N 21/21 |

OTHER PUBLICATIONS

International Search Report and Written Opinion in corresponding International Application No. PCT/EP2022/063501, dated Oct. 21, 2022 (10 pages).

German Search Report in corresponding German Application No. 10 2021 113 065.4, dated Nov. 24, 2021 (6 pages).

* cited by examiner

102

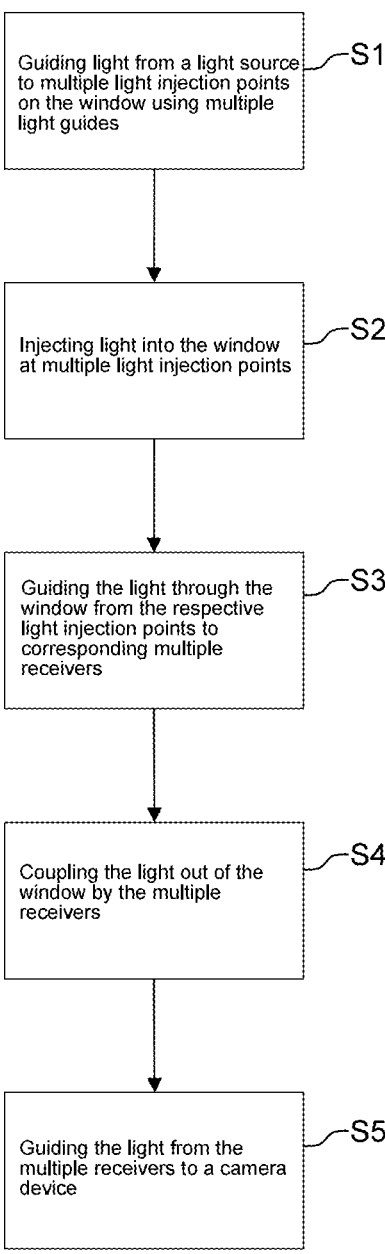

Guiding light from a light source to multiple light injection points on the window using multiple light guides — S1

Injecting light into the window at multiple light injection points — S2

Guiding the light through the window from the respective light injection points to corresponding multiple receivers — S3

Coupling the light out of the window by the multiple receivers — S4

Guiding the light from the multiple receivers to a camera device — S5

FIG. 8

RAIN SENSOR SYSTEM, VEHICLE AND METHOD FOR DETECTING RAIN

The invention relates to a rain sensor system for detecting rain on a window of a vehicle, to a vehicle comprising such a rain sensor system and to a method for detecting rain.

Camera devices used to capture images of an area surrounding a vehicle can also be used to detect the presence of water such as rain on a windscreen of a vehicle.

DE 10 2009 000 005 A1 discloses such a camera device which is used to detect rain on a windscreen. A test light signal is coupled into the windscreen and totally reflected multiple times by a surface of the windscreen. The light is then coupled out of the windscreen at an outcoupling point, which lies in the field of view of the camera device such that the camera device can evaluate the outcoupled test light signal and determine whether there is rain on the windscreen or not.

In EP 0 832 798 B1, a camera is used to directly monitor a portion of the windscreen and thereby identify raindrops.

U.S. Pat. No. 2,011,253 917 A1 discloses an optical module including two separate optical elements guiding light to different portions of a semiconductor element that is sensitive to electromagnetic radiation such that the semiconductor element receives light from an optical far range and from an optical near range in different regions thereof. An illumination source can be used to couple light into the windscreen and a decoupling element can be used to decouple the light from the windscreen into the region of the optical near range. The optical module detects the scattered radiation caused by the raindrops to detect rain on the windscreen.

It is one objective of this invention to provide an improved rain sensor system.

According to a first aspect, a rain sensor system for detecting rain on a window of a vehicle is provided. The rain sensor system comprises:

a camera device configured to capture images of an area surrounding the vehicle which is located in a field of view of the camera device; and multiple rain sensors which are arranged on the window and at least partially in the field of view of the camera device, each rain sensor comprising:

a light guide which is configured to guide light from a light source to a light injection point at which the light is injected into the window, and a receiver configured to receive the light injected into the window and guided to the receiver through the window, and to guide the received light to the camera device.

Using multiple light guides and receivers is advantageous in that rain can be detected at different locations on the window. Further, a rain intensity can be detected more accurately using multiple such sensors. Since the receivers guide the received light to the camera device, the camera device can advantageously analyze multiple light beams received from the multiple receivers. Individual analysis devices for each individual light beam may not be required.

The vehicle is preferably a motor vehicle. The vehicle may be a passenger vehicle, such as a car, bus, truck, train, plane, or the like. The window of the vehicle is preferably a windscreen (front window) or a back window of the vehicle. The window can be made of glass. Detecting rain on the window and/or measuring a quantity of rain on the window can be useful to accordingly control the wipers.

Further, detecting the presence of rain on the window can be useful to accordingly correct the images captured by the camera device.

The camera device can be installed behind the window, on an interior side of the vehicle. It can be used to capture images, in particular video images, of the surroundings of the vehicle. The camera device can also be referred to as a dashcam, a front camera and/or a car digital video recorder. The field of view of the camera device is the angle through which the camera device can pick up electromagnetic radiation and accordingly capture images. The area surrounding the vehicle is preferably located in front of the vehicle.

The light source may be part of the rain sensor system or can be a separate element. The light source can be implemented as a light emitting diode (LED). Each rain sensor can have its own light source. Alternatively, multiple and/or all rain sensors can share a single light source.

The wavelength of the light can be chosen such that it is on the edge of the quantum efficiency curve of the rain sensors. Such a wavelength is usually invisible for the human eye and provides an option to use color filters in the camera device.

The term "multiple" designates at least two, preferably at least four or six. The multiple rain sensors may all be identical to one another or there may be differences between the multiple rain sensors. Each rain sensor comprises at least one light guide (wave guide) and at least one receiver. Preferably, each rain sensor comprises exactly one light guide and exactly one receiver, and in particular no further elements. The multiple rain sensors may be optically uncoupled (separated, independent) from one another. In other words, light guides and/or receivers are not shared between rain sensors.

The light guides and the receivers may be optical elements, in particular diffractive or refractive optical elements. Each rain sensor has a light injection point associated thereto. The light injection point may be a point (or a sport, region, area) on the window at which the light guide of the associated rain sensor is coupled into the window.

The rain sensors may be entirely arranged in the field of view of the camera device. If only a part of the rain sensor is arranged in the field of view of the camera device, the receiver is preferably arranged in the field of view of the camera device.

Each light guide is arranged between the light source and the light injection point associated with the light guide. The light guide can comprise one or multiple reflective surfaces for totally reflecting the light towards the light injection point. The light guide can be a holographic optical element. In particular, the light guide collimates the light towards the light injection point.

At the light injection point, the light preferably leaves the light guide and gets coupled ("injected") into the window. The refractive index of the window is preferably higher than the refractive index of the light guide. As a result, at the light injection point, which is a light guide-window interface, the light leaves the light guide and reaches the window.

The window may reflect the received light on its inside and thereby guide the light towards the receiver. The receivers may be diffractive optical elements and/or holographic optical elements. When no water is present on the window, the window may perform at least one total reflection of the light between the light injection point and the receiver. In particular, the light gets totally reflected at window-air interfaces, in particular because the refractive index of the glass forming the window is higher than that of air. The refractive index of the receiver is preferably higher than the refractive index of the window. As a result, at the window-receiver interface, the light leaves the window and reaches the receiver. The receiver then transmits the received light to the camera device, which is indicative of no droplet on the window.

When rain is present on the window, the transmission of light by the window varies. In particular, as compared to the case where no water is present on the window, a window with water droplets transmits less light or no light at all to the receiver due to a loss in the total reflection in the window. The receiver transmitting less to no light to the camera device is indicative of a droplet on the window.

The rain sensor elements preferably solely include optical elements and no analysis or processing unit which allow to detect rain on the window. Rather, the rain detection is performed by the camera device which receives the light from the receivers of the rain sensors. Camera optics of the camera device may be used both for capturing images of the area surrounding the vehicle and for detecting rain on the window based on the light received from the receivers. This resource sharing simplifies the design of the rain sensor system.

According to an embodiment, the camera device includes an analysis unit configured to determine a quantity of rain on the window and/or a location of raindrops on the window based on the light received at the camera device from the respective receiver.

The information about the location of the raindrops can be used directly by the camera device to correct the captured images and remove distortions from the raindrops. Alternatively or additionally, the camera device may provide the information about the location of the raindrops to an external processing unit, which performs analysis algorithms on the captured images.

According to a further embodiment, the camera device includes a correction unit configured to correct the captured images of the area surrounding the vehicle based on the location of the raindrops on the window determined by the analysis unit.

Correcting the images of the area surrounding the vehicle captured by the camera device in particular allows removing distortions in the images resulting from raindrops on the window. As a consequence, images of an improved quality can be obtained. The analysis unit may be a dedicated chip for image corrections located on the camera device.

According to a further embodiment, the receivers of the multiple rain sensors are arranged in an array, in particular in a square array.

An array in particular designates an arrangement in rows and columns. In a same row, a distance between neighboring elements may be constant. In a same column, a distance between neighboring elements may be constant.

The array of receivers may be an n×m array, with n≥2 and m≥2, in particular with 2≤n≤8 and 2≤m≤8, wherein n is the number of rows and m is the number of columns. A square array can designate an array in which n=m.

The receivers being arranged in an array in particular means that light outcoupling points, at which light is coupled out of the window, are arranged in an array. Further, the light injection points may also be arranged in an array, preferably in an array having the same shape, dimension and/or characteristics as the receiver array.

According to a further embodiment, the rain sensor system includes a flexible polymer film in which the multiple rain sensors are formed.

The flexible polymer film can be adhesively fixed on the window, on an interior side of the vehicle. The flexible polymer film preferably faces the camera device. The flexible polymer film may be arranged partly or entirely in the field of view of the camera device. A thickness of the film may be between 50 μm and 500 μm, preferably between 50 μm and 150 μm. The multiple rain sensors, namely the light guides and the receivers can be integrally formed by the flexible polymer film. In other words, the light guides and the receivers are made of the flexible polymer film. The light guides and the receiver are parts of the flexible polymer film. The light guides and the receiver are integrated into the flexible polymer film. The light guides and/or the receivers may be flexible optical elements.

The light source may be provided on a side of the flexible polymer film. The light source is preferably detached from the flexible polymer film.

According to a further embodiment, the flexible polymer film has a first region with a first refractive index and second regions forming the light guides and/or the receivers which have refractive indices which are different from the first refractive index.

The light guides and/or the receivers can be formed by locally engraving the flexible polymer film, for example using a laser, and/or by photopolymerization of the flexible polymer film, for example using a laser. Accordingly, the light guides and/or the receivers can be arranged next to one another in a same plane of the flexible polymer film.

It is also possible to provide the light guides and/or receivers in different masked layers of wave-guiding polymer sheets which are stacked on each other to make a multi-layered waveguide structure.

According to a further embodiment, the flexible polymer film is transparent.

This is advantageous because the flexible polymer film (and hence the light guides and the receivers) can be placed in the field of view of the camera without obstructing the field of view of the camera. The camera device may record images of the area surrounding the vehicle and of the raindrops on the window at the same time.

According to a further embodiment, each receiver collimates the received light straight onto the camera device, or the receivers from the multiple rain sensors focus the received light on a single spot of the camera device.

"Straight" in particular means that the receiver guides the received light to the camera optics of the camera device along a straight line, for example along the shortest straight line between the receiver and the camera optics, for example perpendicularly to a surface of the camera optics which is sensitive to electromagnetic radiation. As a result, the captured image shows points in places where droplets are residing on the window.

The multiple receivers focusing the received light on a single spot (point, dot) of the camera device allows measuring the rain intensity on the window. As a result, the captured image shows a single point indicating an intensity of rain on the window.

According to a further embodiment, the light guide injects the light into the window at an angle that allows only one single total reflection of the light in the window before it reaches the receiver when no raindrop is present on the window.

When there is no rain on the window, the light is totally reflected only once by the window between the light injection point and the receiver. This facilitates calibration of the respective rain sensors. Further, an area required for guiding the light through the window is minimized, whereby a larger number of rain sensors can be placed beside each other in the field of view of the camera.

According to a second aspect, a vehicle comprising the rain sensor system according to the first aspect or according to an embodiment thereof is provided.

Features described in conjunction with the rain sensor system according to the first aspect or according to an embodiment thereof equally apply to the vehicle according to the second aspect.

According to a third aspect, a method for detecting rain on a window of a vehicle is provided. The method comprises:

guiding light from at least one light source to multiple light injection points on the window using multiple light guides;

injecting the light into the window at the multiple light injection points;

guiding the light through the window from the respective light injection points to corresponding multiple receivers;

coupling the light out of the window by the multiple receivers; and guiding the light from the multiple receivers to a camera device, the camera device capturing images of an area surrounding the vehicle which is located in a field of view of the camera device, wherein the light guides and/or the receivers are at least partially arranged on the window in the field of view of the camera device.

The method is in particular performed using the rain sensor system according to the first aspect or according to an embodiment thereof.

Bright spots may occur on the captured imaged at the positions of the rain sensors. To remove these bright spots, the light source for the rain sensor may be pulsed to provide "spot free" image acquisitions.

Features described in conjunction with the rain sensor system according to the first aspect or according to an embodiment thereof equally apply to the method according to the third aspect.

The invention has been described in terms of different embodiments. It is to be understood that one or more features of any one embodiment may be combinable with one or more features of the other embodiments. In addition, any single feature or combination of features in any of the embodiments may constitute additional embodiments.

Further embodiments or aspects of the invention are subject to the depending claims and the examples which are described in the following with reference to the figures.

FIG. 8 shows a method for detecting rain on a window.

In the figures, like elements are denoted with the same reference numerals unless otherwise indicated.

Figure 1:
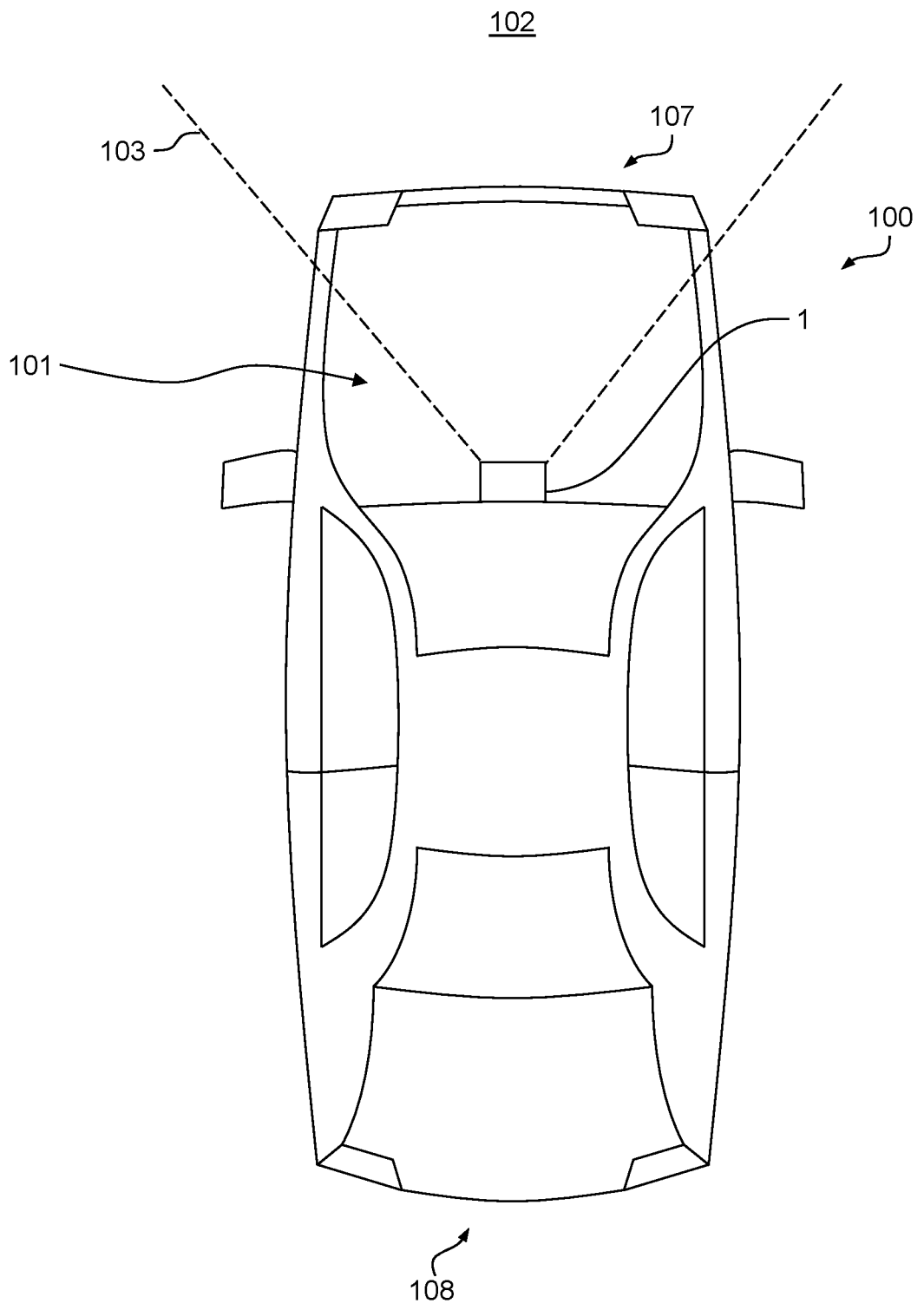
FIG. 1 shows a view of a vehicle.

FIG. 1 shows a view of a vehicle 100, which is a car. On its front 107, the car 100 has a window 101, which is a windscreen. On an interior of the car 100, a rain sensor system 1 is mounted to the window 101. The rain sensor system 1 is mounted at or near a rear-view mirror (not shown) of the car 100.

Figure 2:
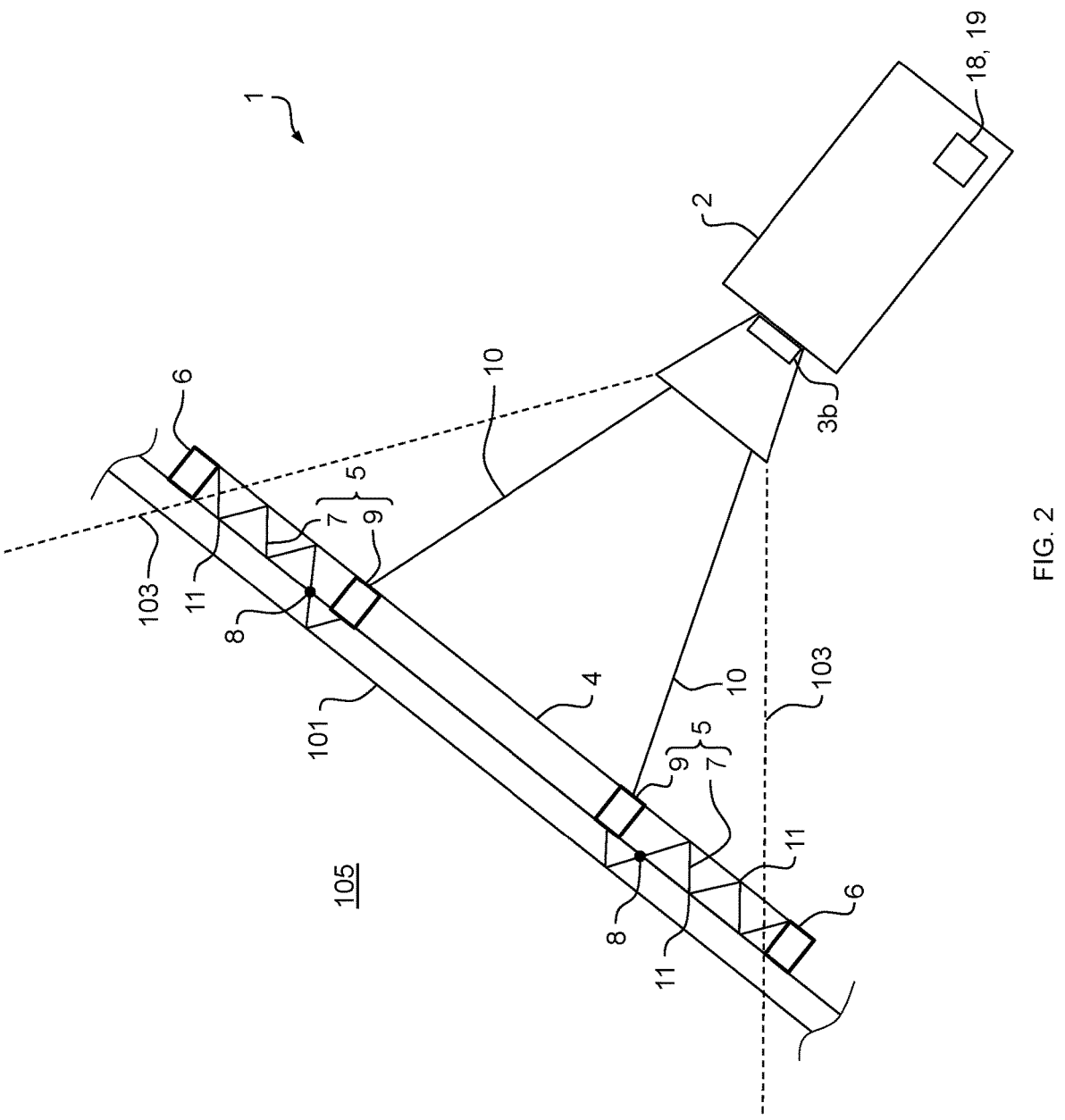
FIG. 2 shows a rain sensor system.

The rain sensor system 1 of the car 100 is for example a rain sensor system 1 as shown in FIG. 2. FIG. 2 shows a positioning of the rain sensor system 1 with respect to the windscreen 101. In detail, the rain sensor system 1 includes a camera device 2 and multiple rain sensors 5.

The camera device 2 is arranged at a distance from the windscreen 101, on an interior 104 of the car 100. The camera device 2 is a dashcam and has a field of view 103. It captures images of the car's 100 surroundings 102 within the field of view 103. In order to capture the images of the area surrounding 102 the vehicle 100, the camera device 2 includes an optical surface 3b which is sensitive to electromagnetic radiation.

In the example of FIG. 2, the rain sensor system 1 includes two rain sensors 5. The rain sensors 5 are arranged on an interior 104 of the car 100 and stuck to the windscreen 101. Each rain sensor 5 includes a light guide 7 and a receiver 9 which are both optical element. The rain sensors 5 are both formed in a flexible polymer film 4, which will be described below.

In the following, the functionality of only one rain sensor 5 will be explained in detail, in particular with reference to FIGS. 2, 3 and 4. The two rain sensors 5 being identical to each other, the described features and functionalities hold for both rain sensors 5. The optics of the two rain sensors 5 are independent from one another.

In the orientation of FIG. 2, light sources 6 in the form of LEDs are arranged above and below the polymer film 4 such as to contact the respective light guides 7. The LEDs 6 emit light and inject the emitted light into the light guides 7. Each light guide 7 guides the light through a portion of the polymer film 4 towards a light injection point 8 formed at an interface between the windscreen 101 and the polymer film 4. Within the light guide 7, the light gets totally reflected multiple times at interfaces between the polymer film 4 and air and between the polymer film 4 and the windscreen 101 (see FIG. 3). The points at which a total reflection occurs in the light guide 7 are total reflection points 11. Only some of the total reflection points 11 have reference signs in FIG. 2.

At the light injection point 8, the light leaves the light guide 7 and is injected into the window 101. When no raindrop 12 is located on the window 101, the light injected into the window 101 at the light injection point 8 gets totally reflected at the interface between the window 101 and the air outside the car 100. This is shown in FIG. 3. As a result, the light gets reflected towards the receiver 9. The light is coupled out of the window 101 at the receiver 9. The receiver 9 then collimates the received light and guides it straight towards the camera device 2, as shown in FIG. 3. The camera device 2 includes a camera lens 3a which bundles the received light beams and the optical surface 3b which is sensitive to the received light. The optical surface 3b is the same surface as the one used by the camera device 2 to capture the images of the area surrounding 102 the car 100.

Figure 4:
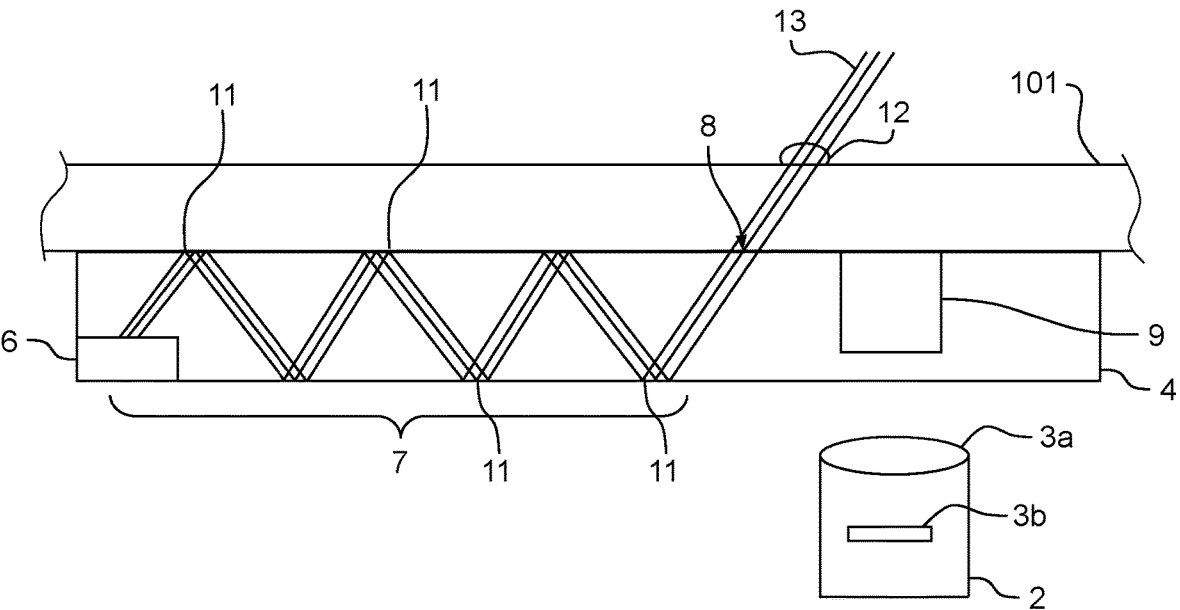
FIG. 4 shows a light transmission with a raindrop on the window.

When a raindrop 12 is located on the window 101, as shown in FIG. 4, the light in the window 101 does not get totally reflected towards the receiver 9. Rather, the light (lost light 13) leaves the window 101 at the interface between the window 101 and the raindrop 12, and no light is reflected towards the receiver 9. As a result, the receiver 9 does not guide any light to the camera device 2.

Depending on the quantity of light received by the receiver 9 and transmitted to the camera device 2, the camera device 2 can detect rain on the window 101. In detail, the camera device 2 includes an analysis unit 18 (see FIG. 1) for analyzing the light signal received from the receiver 9. The analysis unit 18 can detect the location of the raindrops 12 on the window 101 by analyzing individual light signals received from the multiple rain sensors 5 and/or the total quantity of rain on the window 101 by analyzing how many of the multiple rain sensors 5 indicate the presence of a raindrop 12.

The camera device 2 of FIG. 1 further includes a correction unit 19 which uses the analysis result from the analysis unit 18 to correct the images from the area 102 surrounding the car 100 captured by the camera device 2 and remove distortions therein.

Figure 5:
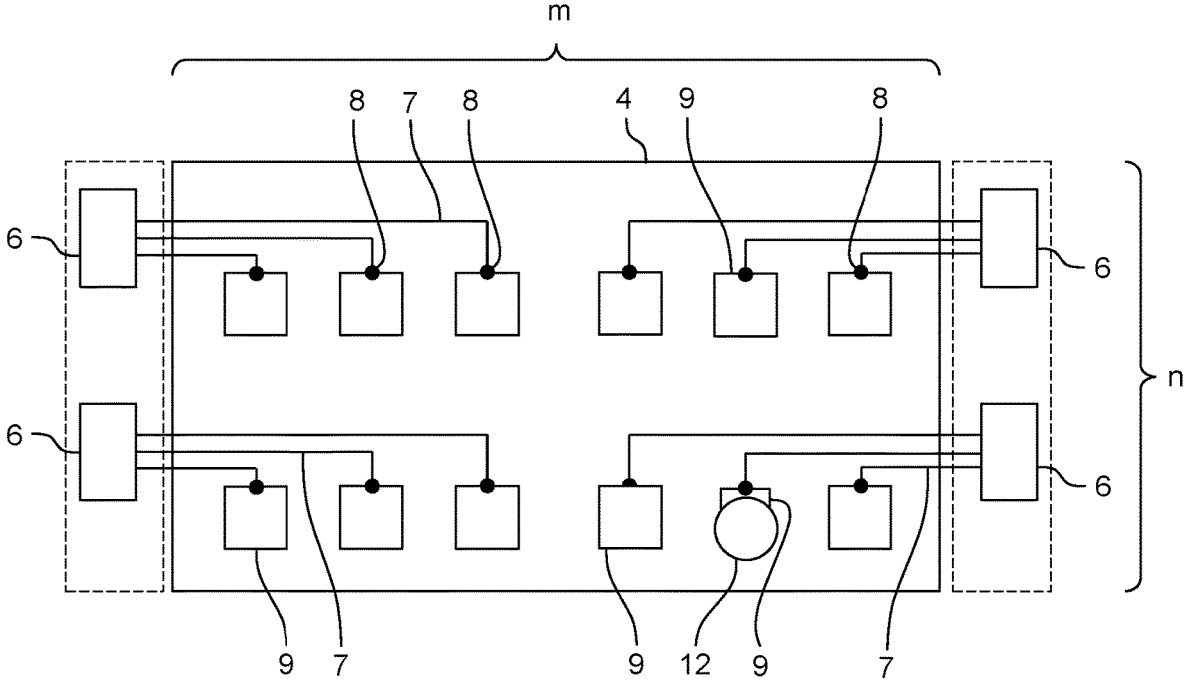
FIG. 5 shows an example of a flexible polymer film.

An example of a polymer film 4 for a rain sensor system 1 is shown in FIG. 5. The polymer film 4 of FIG. 5 can for example be used instead of the polymer film 4 of the rain sensor system 1 of FIG. 2. As shown in FIG. 5, the polymer film 4 includes twelve receivers 9, which are arranged in an array of m=6 columns and n=2 rows. The polymer film 4 also includes twelve light guides 7, each light guide 7 being associated with a light injection point 8 and one of the receivers 9.

Each light guide 7 transmits light from one of the light sources 6 (LEDs) to the associated light injection point 8. In the example of FIG. 5, there are only four light sources 6, meaning that the light from each light source 6 is guided towards three light injection points 8. The twelve light injection points 8 are arranged in an array having the same shape as the array forming the receivers 9, namely an array of m=6 columns and n=2 rows.

The light guides 7 and the receiver 9 are part of the polymer film 4. In detail, they are formed by photopolymerization of the polymer film 4 using a laser. The refractive index of the flexible polymer film 4 is locally modified by the photopolymerization, thereby forming the light guides 7 and the receiver 9.

An initial refractive index of the polymer film 4 before photopolymerization is a first refractive index. After photopolymerization, the polymer film 4 has refractive indices which are different from the first refractive index in regions (second regions) of the polymer film 4 in which photopolymerization was performed, namely in regions of the polymer film 4 forming the light guides 7 and receivers 9. Outside of the photopolymerized areas (in first regions of the polymer film 4), the refractive index of the polymer film 4 remains at the first refractive index.

Figure 3:
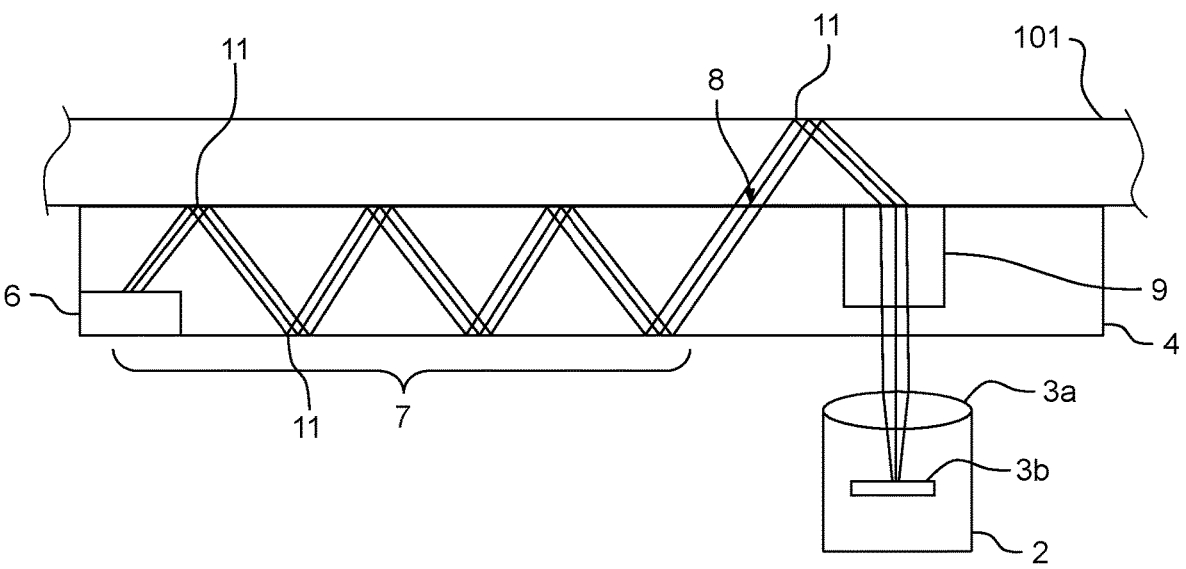
FIG. 3 shows a light transmission without raindrop on the window.

The twelve rain sensors 5 of FIG. 5 formed by the twelve light guides 7 and the corresponding twelve receivers 9 each have the same way of functioning as the rain sensor 5 described in FIGS. 3 and 4. In particular, in the light guide 7, the light gets totally reflected multiple times until it reaches the light injection point 8. There, the light leaves the polymer film 4 and is injected into the window 101, where it is totally reflected towards the receiver 9 only if no raindrop 12 is sitting on the window 101. The receiver 9 transmits the received light towards the camera device 2.

Figure 6:
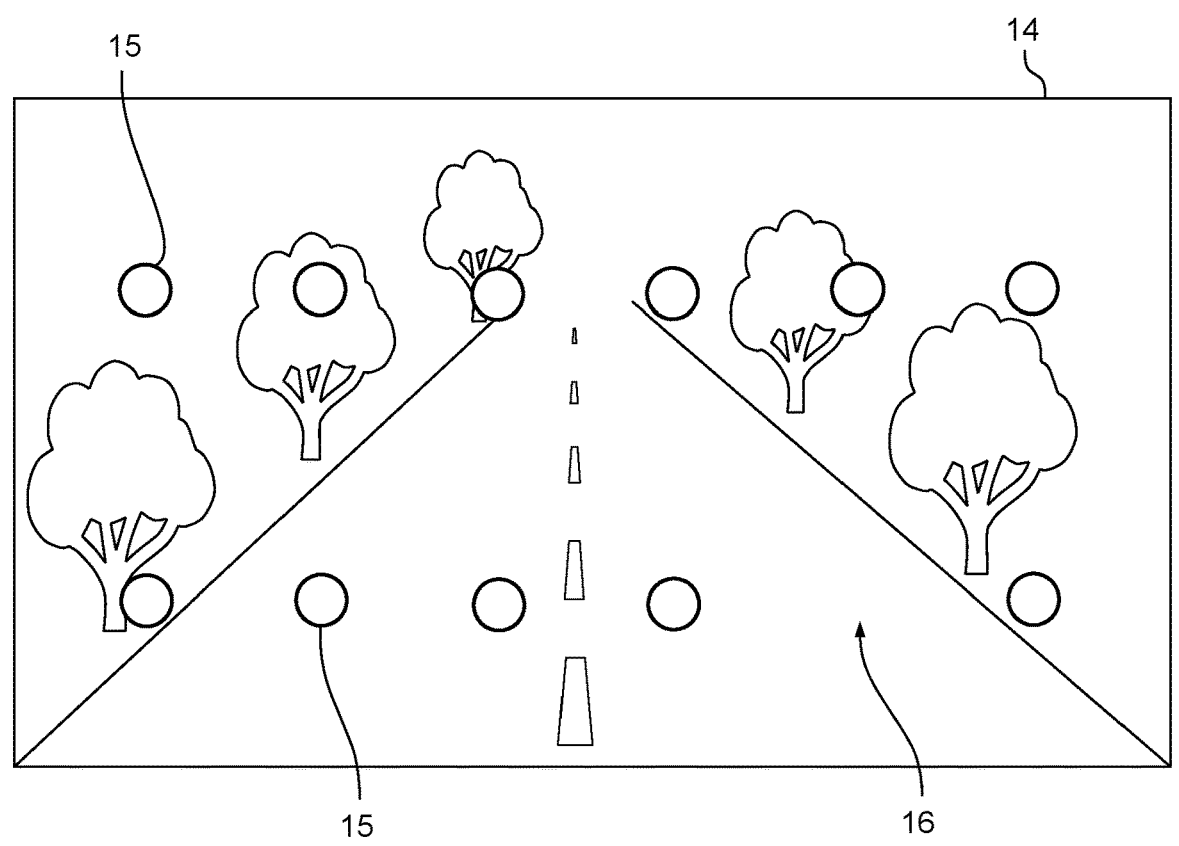
FIG. 6 shows a first example of an image captured by a camera device.

FIG. 6 shows an example of an image 14 captured by the camera device 2. The image 14 shows a representation of the area 102 surrounding the vehicle 100. In the example of FIG. 6, the image 14 shows a road with trees on both sides. The light received from the receiver 9 on the optical surface 3*b* of the camera device 2 is represented on the image 14 by dots 15. The dots 15 are located at positions on the image 14 corresponding to the location of the light injection points 8 and/or receivers 9 of FIG. 5 in the field of view 103 of the camera device 2.

The presence of a dot 15 on the image 14 is indicative of no raindrop 12 being located on the area of the window 101 sensed by the corresponding rain sensor 5. Where there is a raindrop 12 on the window 101, the image 14 has no dot 15. In the example of FIG. 6, eleven rain sensors 5 have detected no raindrop 12, which is represented by eleven dots 15 while one rain sensor 5 has detected a raindrop 12, which is indicated by a missing dot 15 at the raindrop position 16. The raindrop position 16 on the image 14 in FIG. 6 is indicative of the raindrop 12 shown in FIG. 5.

The analysis unit 18 can analyze the image 14 of FIG. 6 to determine where raindrops 12 are positioned. The correction unit 19 of the camera device 2 can use the images 14 of FIG. 6 and/or the information about the location of the raindrops 12 from the analysis unit to correct the image 14. In detail, the correction unit 19 performs correction and removes distortions in the image 14 at the position 16 at which a raindrop 12 is detected.

Figure 7:
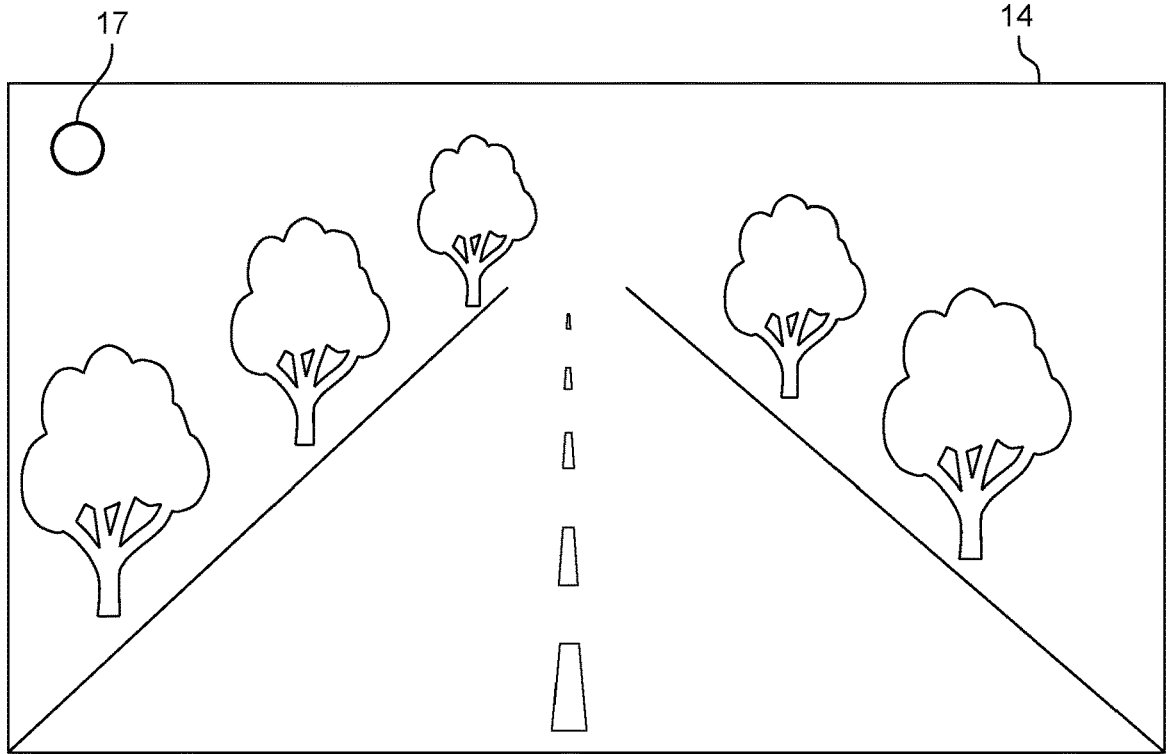
FIG. 7 shows a second example of an image captured by a camera device.

FIG. 7 shows another example of an image 14 captured by the camera device 2. Instead of including multiple dots 15 indicative of the positions of the rain sensors 5 and of the absence of raindrops 12, the image 14 can include a single dot 17, which is indicative of an overall rain intensity on the window 101. In detail, to obtain the image 14 of FIG. 7, all receivers 9 guide the received light to a single point of the optical surface 3*b* of the camera device 2. This can be achieved by adding additional light guides to the polymer film 4 to guide the light received at the respective receivers 9 to a particular point facing the single point on the optical surface 3*b*. The brighter the single dot 17, the fewer raindrops are detected by the entire rain sensor system 1.

The analysis unit 18 can analyze the image 14 of FIG. 7 to determine an overall quantity of rain on the window 101. The determined quantity of rain can then be used to correspondingly control an operation of rain wipers.

FIG. 8 shows a method for detecting rain on a window 101 of a vehicle 100 using the rain sensor system 1. In a step S1, light is guided from a light source 6 to multiple light injection points 8 on the window 101 using multiple light guides 7. In a step S2, the light is injected into the window 101 at the multiple light injection points 8. In a step S3, the light is guided through the window 101 from the respective light injection points 8 to corresponding multiple receivers 9. In a step S4, the light is coupled out of the window 101 by the multiple receivers 9. In a step S5, the light is guided from the multiple receivers 9 to a camera device 2, the camera device 2 capturing images 14 of an area 102 surrounding the vehicle 100 which is located in a field of view 103 of the camera device 2, wherein the light guides 7 and/or the receivers 9 are at least partially arranged on the window 101 in the field of view 103 of the camera device 2.

While the present technology has been described in connection with several practical examples, it is to be understood that the technology is not to be limited to the disclosed examples, but on the contrary, is intended to cover various modifications and equivalent arrangements. For example, the vehicle may be a train, truck or the like instead of a car. The rain sensor system 1 could be mounted at the back 108 of the vehicle 100 instead of at the front 107 (see FIG. 1). The number of light guides 7 and receivers 9, their shape and arrangement can differ from that of FIG. 2 of 5.

REFERENCE SIGNS

1 rain sensor system
2 camera device
3*a* lens
3*b* optical surface
4 flexible polymer film
5 rain sensor
6 light source
7 light guide 8 light injection point
9 receiver
10 received light
11 total reflection point
12 raindrop
13 lost light
14 image
15 dot
16 raindrop position
17 intensity dot
18 analysis unit
19 correction unit
100 vehicle
101 window
102 surrounding area
103 field of view
104 interior
107 front
108 back
m number of columns
n number of rows

The invention claimed is:

1. A rain sensor system for detecting rain on a window of a vehicle, the rain sensor system comprising:
a camera device configured to capture images of an area surrounding the vehicle, wherein the area is located in a field of view of the camera device; and
multiple rain sensors which are arranged on the window within a flexible polymer film and at least partially in the field of view of the camera device, wherein the flexible polymer film has a first region with a first refractive index and a plurality of second regions, wherein each of the second regions comprises a rain sensor comprising:
a light guide which is configured to guide light from a light source to a light injection point at which the light is injected into the window, and
a receiver configured to receive the light injected into the window and guided to the receiver through the window, and to guide the received light to the camera device.

2. The rain sensor system according to claim 1, wherein the camera device further comprises an analysis unit configured to determine a quantity of rain on the window and a location of raindrops on the window based on the light received at the camera de vice from the respective receiver.

3. The rain sensor system according to claim 2, wherein the camera device further comprises a correction unit configured to correct the captured images of the area surrounding the vehicle based on the location of the raindrops on the window determined by the analysis unit.

4. The rain sensor system according to claim 1, wherein the receivers of the multiple rain sensors are arranged in an array.

5. The rain sensor system according to claim 1, wherein the receivers have refractive indices which are different from the first refractive index.

6. The rain sensor system according to claim 1, wherein the flexible polymer film is transparent.

7. The rain sensor system according to claim 1, wherein each receiver collimates the received light straight onto the camera device, or wherein the receivers from the multiple rain sensors focus the received light on a single spot of the camera device.

8. The rain sensor system according to claim 1, wherein the light guide injects the light into the window at an angle that allows only one single total reflection of the light in the window before the light reaches the receiver when no raindrop is present on the window.

9. A vehicle comprising the rain sensor system according to claim 1.

10. A method for detecting rain on a window of a vehicle, the method comprising:
guiding light from at least one light source to multiple light injection points on the window using multiple light guides within multiple rain sensors arranged on the window in a flexible polymer film, wherein the flexible polymer film has a first region and a plurality of second regions, wherein each of the plurality of second regions comprises a rain sensor comprising a light guide and a receiver;
injecting the light into the window at the multiple light injection points;
guiding the light through the window from the respective light injection points to corresponding multiple receivers within the plurality of second regions of the flexible polymer film;
coupling the light out of the window by the multiple receivers; and
guiding the light from the multiple receivers to a camera device,
wherein the camera device captures images of an area surrounding the vehicle,
wherein the vehicle is located in a field of view of the camera device,
wherein the light guides and the receivers are at least partially arranged on the window in the field of view of the camera device,
wherein the first region of the flexible polymer film has a first refractive index.

11. The rain sensor system according to claim 1, wherein a refractive index of the window is greater than a refractive index of the light guide.

12. The rain sensor system according to claim 1, wherein the refractive index of the receiver is greater than a refractive index of the window.

* * * * *